No. 633,091. Patented Sept. 12, 1899.
J. E. BAIRD.
POTATO DIGGER.
(Application filed Jan. 10, 1899.)
(No Model.) 4 Sheets—Sheet 1.

Fig. 1.

WITNESSES
Geo. E. Frech.
Josephine C. Peck.

INVENTOR
John E. Baird
Per Hubert E. Peck
Attorney

THE NORRIS PETERS CO., PHOTO-LITHO., WASHINGTON, D. C.

No. 633,091. Patented Sept. 12, 1899.
J. E. BAIRD.
POTATO DIGGER.
(Application filed Jan. 10, 1899.)
(No Model.) 4 Sheets—Sheet 3.

WITNESSES
Geo. E. Frech.
Josephine C. Peck.

INVENTOR
John E. Baird
Hubert E. Peck
Attorney

UNITED STATES PATENT OFFICE.

JOHN E. BAIRD, OF UTICA, NEW YORK.

POTATO-DIGGER.

SPECIFICATION forming part of Letters Patent No. 633,091, dated September 12, 1899.

Application filed January 10, 1899. Serial No. 701,709. (No model.)

*To all whom it may concern:*

Be it known that I, JOHN E. BAIRD, a citizen of the United States, residing at Utica, in the county of Oneida and State of New York, have invented certain new and useful Improvements in Potato-Diggers; and I do hereby declare the following to be a full, clear, and exact description of the invention, such as will enable others skilled in the art to which it appertains to make and use the same.

This invention relates to certain improvements in potato-diggers; and the objects and nature of the invention will be obvious from what follows.

The invention consists in certain novel features in construction and in combinations and in arrangements of parts and of details, as more fully and particularly described and set forth hereinafter.

Referring to the accompanying drawings, which illustrate an example of many constructions within the scope of my invention.

In the drawings, $a$ is the axle, provided with the large supporting and driving wheels $a'$ $a'$, loose thereon and connected thereto by ratchet mechanisms $a^2$ $a^2$ to rotate the axle forwardly, but to run freely thereon when the wheels are moving or turning backwardly.

$b$ is a tube or sleeve through which the axle passes and which extends practically the full length of the axle between said wheels, except for the space required for the hub of a driving-gear rigid on the axle, as hereinafter set forth. This sleeve is provided with the opposite radial or forwardly-extending arms $b'$ $b'$. Each arm is preferably, although not necessarily, adjustably secured to the sleeve, as by a split hub $b^2$, drawn tightly and rigidly around the sleeve by a bolt, so that the arms are fixed to the sleeve. The front ends of the radial arms are pivotally joined to the upper ends of brackets $c$ $c$, rigidly secured to the plow or shovel supports or hangers.

Figure 1:
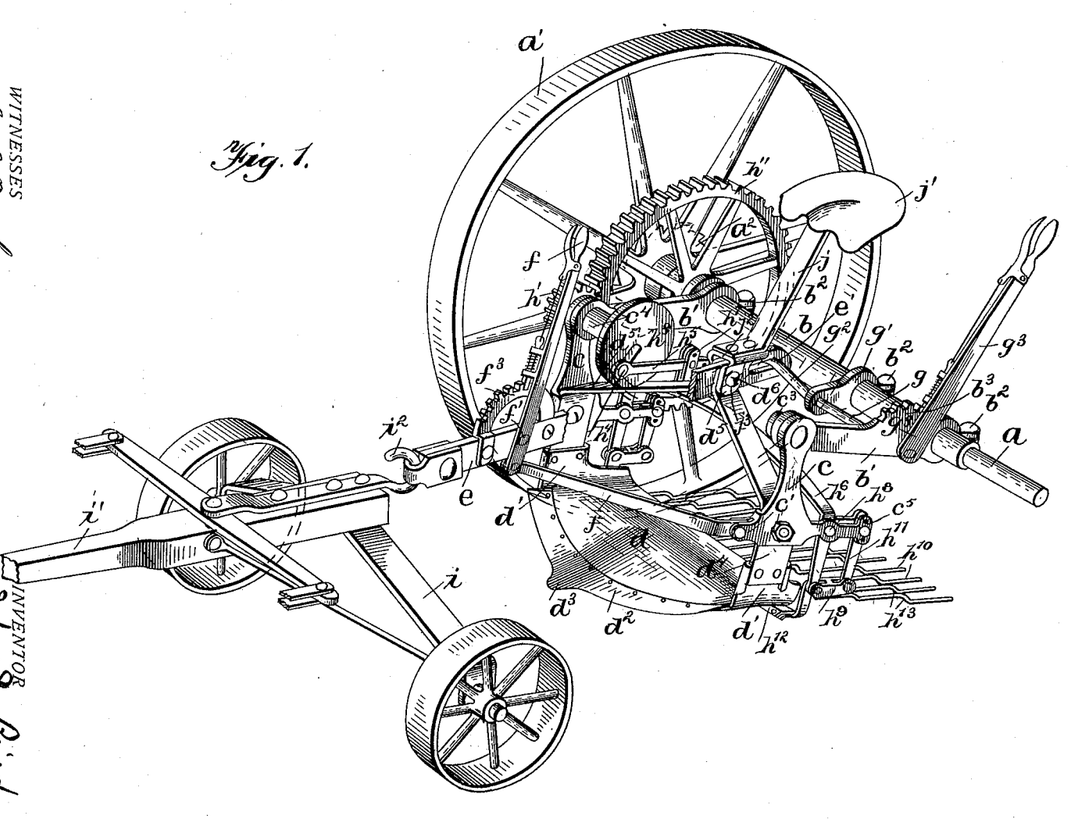
Figure 1 is a perspective view, a rear wheel being removed and the shovel or plow elevated for transportation and the center beam partially broken away.
Figure 2:
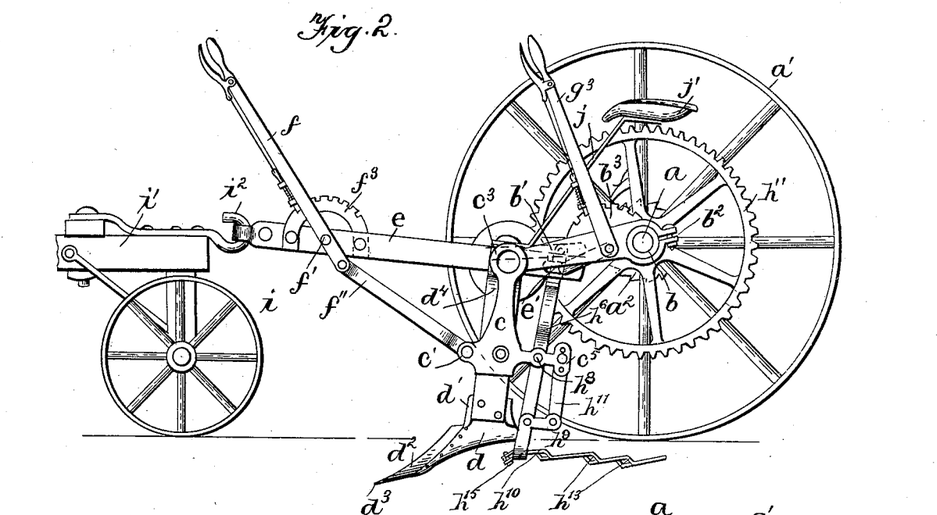
Fig. 2 is a side elevation, a rear wheel removed and the hand-levers thrown forward, so that the shovel is lowered and its point tilted down in position for digging.
Figure 3:
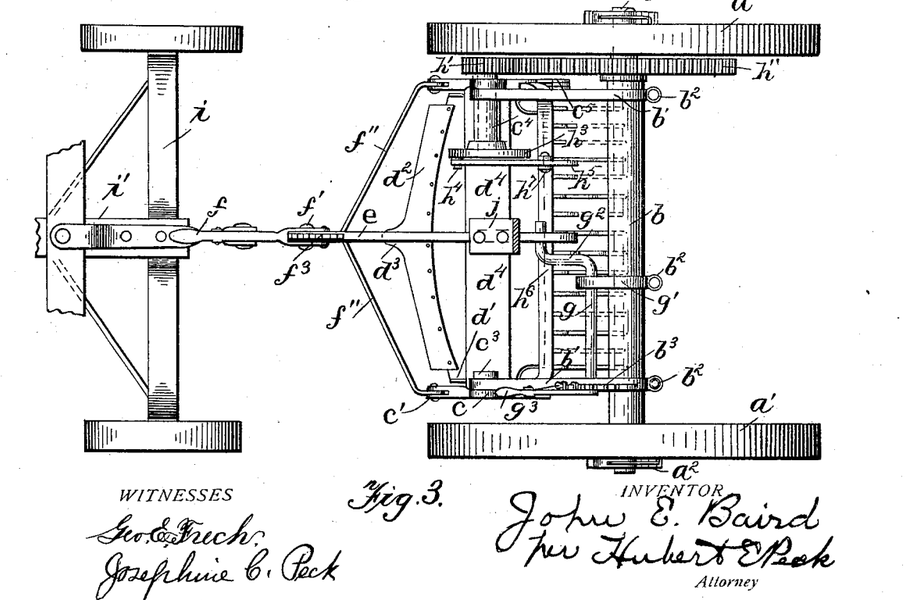
Fig. 3 is a top plan view with the seat-support broken away, the seat not being shown.
Figure 4:
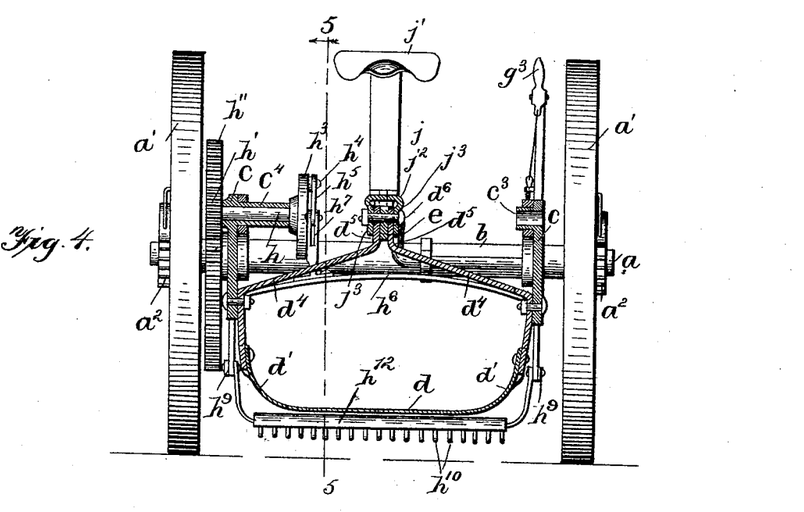
Fig. 4 is a section on the line 4 4, Fig. 5.
Figure 5:
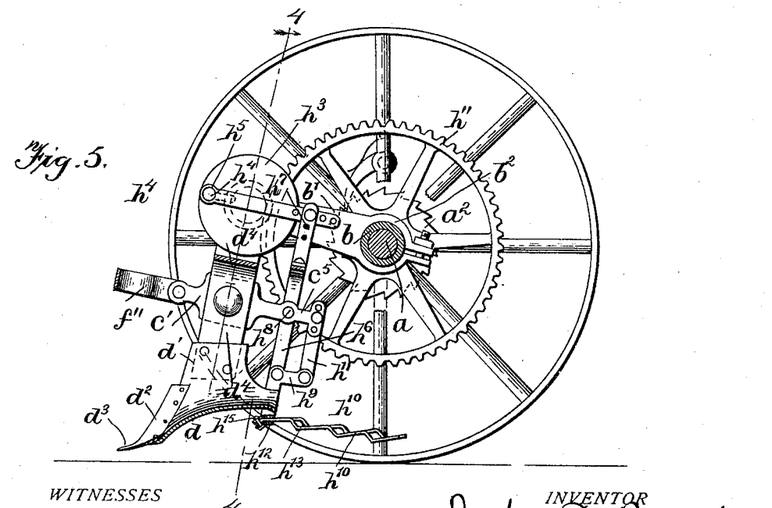
Fig. 5 is a cross-section on the line 5 5, Fig. 4, with the forward part of the machine broken away.
Figures 6, 7, 8, 9, 10, 11, 12:
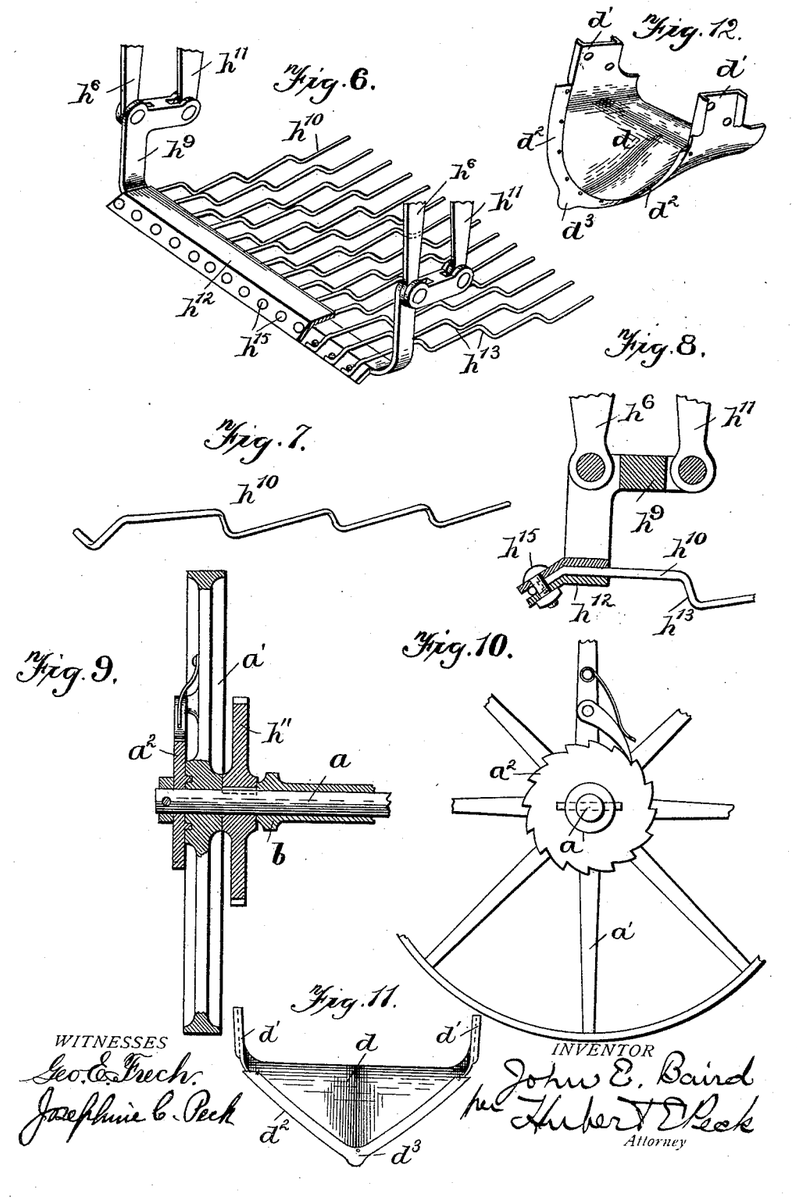
Fig. 6 is a detail perspective view of the separator with parts broken away.
Fig. 7 is a detail elevation of a form of separator-tine which can be used.
Fig. 8 is a detail cross-section through the head of the separator, parts being broken away.
Fig. 9 is a detail section through a driving-wheel and adjacent parts, parts being broken away.
Fig. 10 is a detail elevation showing the ratchet mechanism between a main driving-wheel and axle.
Fig. 11 is a detached front view of the shovel.
Fig. 12 is a detail perspective thereof.

The plow is composed of a transversely-arranged approximately flat or about U-shaped moldboard or shovel $d$, having its ends $d'$ $d'$ turned upwardly. The shovel is curved or shaped to direct the mixed soil and potatoes inwardly and rearwardly onto a separator, hereinafter described. The front edge of the moldboard is preferably formed approximately V-shaped and is centrally depressed, so that the moldboard curves or is inclined from the ends and center down toward the central front edge. The rear edge of the moldboard or shovel is preferably straight across between the upward bends, forming arms $d'$ $d'$, and the rear top face of the moldboard is also straight between said arms, as shown more clearly in Fig. 11, although the rear edge can have a slight drop or downward curve, if so desired, to facilitate the passage of the soil and potatoes onto the separator arranged close beneath the rear transversely-straight portion of said shovel. From the rear edge the shovel curves downwardly and forwardly, preferably so that the central portion of the front edge is very deep or very much depressed. The point of the shovel is hence preferably depressed to move below the potatoes in the trench or hills, and hence slips or roots through the soil without injuring the potatoes and loosens and breaks up the soil, and as the same passes up over the shovel it is spread out by the peculiar shape thereof and delivered onto the separator in a sheet of loose broken soil and potatoes.

This form of shovel works very easily and efficiently in trashy soil and where there are many stones and does not easily clog.

The invention is not limited to the point nor to the employment of the peculiar shovel, which, however, is an important feature of the invention among other features.

The shovel is usually made in one piece of metal, and the arms $d'$ $d'$ are preferably formed with edge flanges, as shown, between which the plow-supports fit and are secured.

$d^2$ is the point, consisting of an elongated blade at its rear edge secured to the longitudinally depressed or recessed front edge of the moldboard and formed with the central downwardly-inclined projection or extremity $d^3$, constituting the point proper of said blade $d^2$. This blade is transversely inclined from its rear edge toward its front edge and is longitudinally curved from its ends downwardly to its central portion.

Material practical advantages are attained by the peculiar shape of the plow, which will not clog and does not cut or bruise the potatoes, but loosens up the soil in the trench and directs the loose soil and potatoes in a single stream upwardly and rearwardly over the point and moldboard as the plow moves forward in a downwardly-inclined position with the cutting edge of its point below the potatoes.

A hanger, support, or bail for the plow is formed by the two bars or plates $d^4$ $d^4$, at their lower ends rigidly secured, respectively, to the upturned or vertical ends $d'$ $d'$ of the moldboard and forming upward extensions thereof. These hangers are deflected inwardly toward each other and at their upper ends have the parallel portions $d^5$ $d^5$, fitting on opposite sides of the main beam or frame $e$ of the machine and pivotally joined thereto by suitable means, such as a bolt $d^6$, passed through said hangers and the beam to permit vertical fore-and-aft swing of the hanger and plow from said beam and on said bolt.

Suitable means are provided to determine the tilt of the plow—that is, the suction thereof or the inclination of the point in forcing the plow into the ground. Various means can be employed for this purpose. As an illustration of what might be used I show an upright hand-lever $f$, straddling the center beam at a point in advance of the plow or near the front end of the beam. The lever is pivoted to the beam by cross-bolt $f'$ to permit vertical fore-and-aft swing of the lever. The lower end of the lever is connected by links $f''$ $f''$ with the plow to swing the same forwardly or rearwardly. The front ends of the links are pivoted to or within the lower end of the lever, and from thence said links are deflected oppositely to opposite sides of the plow and are pivotally united to intermediate points in the vertical lengths of the plow-hangers, respectively. The rear ends of said links are preferably pivoted to rigid forwardly-extending arms $c'$ $c'$ of brackets $c$ $c$, secured to the plow-hangers. Said brackets are rigidly and strongly secured preferably to the outer sides of the plow-hangers, respectively, just above the upturned ends of the shovel or moldboard and tend to brace and strengthen the said hangers; also, each bracket is usually formed with a socket or recess to fit the hanger, and consequently with edges or shoulders engaging the edges of the hanger, so that the bracket is held against turning and enables one strong bolt to lock the bracket to the hanger; also, if desired, each bracket can be cast or otherwise formed integral with its various arms. However, my invention is not limited to the employment of brackets nor to such specific constructions and arrangements of brackets, as the various links and lifting means can be otherwise connected to control the plow.

It should be noted that the pivotal point between the plow-hangers and the center beam and the pivotal points on opposite sides of the center beam and between brackets $c$ $c$ and the front ends of radial arms $b'$ $b'$ are all arranged, preferably, on the same axial line—that is, they all turn on and are arranged in the same straight line. The advantage of this is obvious, for when the radial arms are locked the plow swings back and forth under the impulse of lever $f$ on the said three pivotal points just mentioned. Suitable locking means are provided to lock the plow in the desired tilted position and also the lever $f$. Thus a toothed quadrant $f^3$ is shown rigid with the center beam, and the lever is provided with a hand-clip acting on a suitable spring-actuated pawl normally held in engagement with the teeth of the quadrant. It will thus be observed that the plow is hung from three supports arranged, respectively, above its center and above its ends and also that the plow is further strongly braced and held by the forwardly-extending links to lever $f$, which couple to the plow at points about midway between said pivotal points and the moldboard. The center beam, and consequently the plow, is further braced and held by a lifting rock-shaft $g$, mounted in and extending through one radial arm $b'$ and also intermediate arm $g'$, secured to the sleeve on the axle. This shaft has the forwardly-extending crank $g^2$, with an end journal confined and turning in the slot $e'$ in the end of the beam $e$. This slot is elongated longitudinally of said beam $e$ to permit the said journal of crank $g^2$ to slide back and forth therein as the crank swings without longitudinally moving said beam. The opposite end of said crank or rock shaft $g$ is provided with a lifting hand-lever $g^3$, rigid therewith and extending up therefrom beside the said arm $b'$. The machine is thus provided with means to vary the vertical position of the plow and attached parts. Various mechanisms can be employed for this purpose, although, as at present advised by experience, I prefer the constructions generally about as shown.

It is obvious that when the hand-lever $g^3$ is swung forward the crank of lifting-shaft $g$ permits the center beam to drop or lower vertically, and thereby swings the arms $b'$ $b'$ and the intermediate arm down, the sleeve carrying the same turning on the main axle. This operation lowers the plow, while practically maintaining its position or angle as determined by the forward lever. The working depth of the plow can thus be determined and varied independently of its tilt or angle. By forcing said hand-lever rearwardly the crank-arm will lift the rear end of the center beam, and thereby swing up the arms rigid with the sleeve on the axle, so that the plow can be elevated above the surface of the ground for transportation.

Locking mechanism is provided to hold the plow in the desired vertical adjustment. For instance, I show a tooth-quadrant $b^3$ on arm $b'$, and the lever $g^3$ is provided with a spring-actuated pawl normally meshing with the teeth of the quadrant and controlled by a hand-clip. It will thus be observed that the plow is hung from the rear axle through several supporting connections or devices—viz., at the ends or sides by radial arms $b'$ $b'$ to the side hangers of the plow and at a central point by the crank-shaft to the center beam.

The upwardly-extending arms of the brackets secured to the plow-hanger can be formed or cast with lateral or horizontal hollow hubs or bosses $c^3$ $c^4$, on which the ends of the radial arms $b'$ $b'$ are mounted and turn. One of said bosses $c^4$ can be extended and form the bearing for drive-shaft $h$ at its outer end, having pinion $h'$, meshing with and rotated by gear-wheel $h''$, rigid on the axle of the machine. The inner end of said shaft is shown provided with a crank-disk $h^3$, rigid therewith and carrying a crank-pin $h^4$. Said crank-pin can be rendered radially adjustable of the crank-disk to vary the throw of pitman $h^5$, coupled to said pin. Various means can be employed for this purpose, such as a radial slot in the crank-disk, in which the pin can be clamped at various points. The pitman $h^5$ is at its front end coupled to said crank-pin and at its rear end loosely coupled to the upper portion of a vibratory frame or bail $h^6$, preferably by having its perforated rear end enter a fork $h^7$, rigid with and extending up from said frame $h^6$ and joined thereto by a pivot-bolt passed through the fork and pitman. The pitman can be formed with a longitudinal series of pivot-holes and the bolt passed through any hole, thereby varying the position of the separator. The said frame or bail $h^6$ is preferably formed about U-shaped, with depending ends just in rear of and in about the same planes as the plow-hangers. At a distance above its lower extremities said frame $h^6$ is pivoted or fulcrumed at $h^8$ $h^8$ on horizontal pivots to the rearwardly-extending arms $c^5$ $c^5$ of the said brackets. The ends of the frame extend down from said fulcrums and at their lower ends are pivotally connected to the upturned ends of a cross-bar or head $h^{12}$, extending beneath the rear end or edge of the plow or moldboard and provided with the rearwardly-extending tines or fingers $h^{10}$, rigid therewith and forming the separator or screen. Links $h^{11}$ $h^{11}$, parallel with the end portions of the frame $h^6$, are pivoted at their upper ends to arms $c^5$ $c^5$ and at their lower ends pivotally connected to the cross-bar $h^{12}$ and are arranged a distance from the end portions of frame $h^6$. Hence a parallel link or ruler motion is produced which maintains the separator in approximately fixed straight or parallel planes in its reciprocation rather than imparting a swinging or up-and-down movement to the rear end thereof, as is usual in separators for potato-diggers.

Separators usually have a kicking movement or swing vertically from one end; but I have found this to be objectionable and have provided means in my construction whereby the separator reciprocates longitudinally of the tines and so that the separator at any position in its stroke is approximately parallel with the planes of all other positions the separator assumes in its range of movement. These means, such as links $h^{11}$, also hold the head of the separator against tilting, and thereby maintain the tines in the proper position and assist in upholding the same, and also cause the separator to tilt with the plow by reason of the pivotal connection between the separator vibrating frame and the plow-hanger.

The tine or finger cross-bar is arranged closely beneath the rear end or edge of the shovel, yet out of contact therewith, and its ends turn or extend up just beyond the ends of the moldboard. The ends of the cross-bar are preferably provided with cross-heads $h^9$, secured thereto and to which the links and vibrating frame are pivoted. The tines or fingers are separated from each other and extend rearwardly a suitable distance from the cross-bar and rear end of the plow and are arranged approximately horizontal or in continuation of the moldboard, so that the soil and potatoes pass over the rear edge of the moldboard onto the series of rapidly-reciprocating tines, which loosen the soil and separate the potatoes therefrom. The head or cross-bar $h^{12}$ is preferably formed of two angle-irons, between the ends of which the tines are clamped. Each tine has its rear end bent down to correspond to the angle of said bars and then has said end deflected laterally to form a shoulder or hook. Bolts $h^{15}$ are passed through the rear angles of the bars, and the number of bolts is equal to the number of tines, and the bent end of each tine is caught behind a bolt. Material practical advantages are attained by employing such a construction and arrangement. Each tine can thus be separately formed and easily and separately removed or replaced.

The separator is formed to move the soil and potatoes rapidly rearwardly therefrom and to thoroughly loosen and separate the potatoes and deposit them on the surface of the soil as the machine passes along in a manner which is not possible with straight-tine separators. This object can be attained by providing the tines with rearwardly-facing shoulders which strike the substances on the separator at each rearward reciprocation thereof and force the same rearwardly with rapidity.

The tines are formed with long gradual inclines or faces to slide under the material thereon at each forward reciprocation, which inclines terminate in the rearwardly-facing shoulders, such as $h^{13}$. Thus the shoulders can be formed by downward deflections or bends in the wire or rod forming each tine. Each tine usually has several such deflections, and the deflections or shoulders in adjacent tines are usually formed in different planes transversely of the separator. This peculiar arrangement of separator is of peculiar advantage when the machine is working downhill.

It will be observed that as the machine moves forward the eccentric driving means rapidly vibrates the vertical frame $h^6$ back and forth in the line of draft and that hence the separator is rapidly reciprocated in a practically straight line or plane, as before described.

Various adjustments are provided, substantially as shown, to vary the relative position of the separator with respect to the plow, such as series of bolt-holes, in any one of which removable pivots or bolts can be placed.

As the separator driving-shaft has the same axial line as the pivotal point between the plow and radial arms $b'b'$ and as the driving-gear and sleeve $b$ are both on the axle, the pinion is maintained in mesh with the driving-gear whatever the vertical position of the plow.

Various means can be provided for coupling the center beam with the draft. For instance, I show a front wheeled axle $i$, provided with small wheels and rigidly secured to the rear end of the draft-tongue $i'$. The rear end of the draft-tongue is provided with a strong curved coupling eye or hook $i^2$, detachably (if desired) receiving a vertical eye or loop rigid with the front end of the center beam. The front tongue can thus turn freely to guide or direct the machine, while the peculiar coupling employed permits the free vertical movement of the center beam as the plow is raised and lowered. However, if desired, the beam can be otherwise coupled to the tongue.

The upwardly and rearwardly extending support or spring $j$ for the seat $j'$ is carried by the center beam, so that the weight of the rider can be utilized in forcing the plow into the ground, also so that the various hand-levers are within convenient reach of the rider. The seat-support is usually secured to the said beam immediately over the plow and, if desired, can be united thereto by the pivot-bolt joining the plow-hanger to the beam. Thus I show the lower flat end of the seat-support secured or bolted on the base-plate $j^2$, arranged longitudinally on the upper edge of the center beam, with depending ears $j^3$ straddling said beam and through which the pivot-bolt $d^6$ is passed.

It will be observed that the plow is raised and lowered through the medium of the center beam, the radial arms merely swinging therewith and guiding the same as the sleeve on the axle turns, and thereby at the same time raises or lowers the lifting rock-shaft, and hence that the angle of the plow or its position with respect to the center beam is not varied. The axle and attached parts receive their draft through the said radial arms.

The device described constitutes a most practical and effective machine and employs a minimum number of parts for the functions and operations possible and is exceedingly simple and durable in construction.

It is evident that various changes might be made in the forms, constructions, and arrangements of the parts described without departing from the spirit and scope of my invention. Hence I do not wish to limit myself to the constructions set forth, but consider myself entitled to all changes and modifications within the scope of the invention.

What I claim is—

1. A potato-digger comprising an approximately flat shovel with end supports, a separator comprising a cross-head directly beneath and disconnected from the rear end of the shovel and a series of rearwardly-extending tines formed with rearwardly-facing shoulders, each tine at its front end rigidly secured to said cross-head, said tines supported and controlled through the medium of said cross-head, and separator actuating and controlling mechanisms arranged at the opposite ends of the shovel and pivotally connected with the end portions of said head, said mechanisms sustaining the separator and holding the same to fore-and-aft reciprocation in approximately parallel planes, substantially as described.

2. In an agricultural implement, the combination of supporting means, an approximately flat shovel having end supports and a centrally-depressed front edge and an approximately transversely straight rear edge, a vibrating head arranged transversely beneath said rear end and provided with a series of tines secured thereto and extending rearwardly therefrom and sustained entirely thereby, each tine bent to form rearwardly-facing shoulders with gradual upward inclines terminating in said shoulders, and actuating and controlling means carrying said head and reciprocating said head back and forth in approximately straight parallel planes beneath the plow and thereby vibrating the tines longitudinally, substantially as described.

3. An agricultural implement, comprising supporting means, a digging device, a separator comprising a transversely-arranged head provided with tines rigid therewith and sustained thereby and extending therefrom in the line of draft, a vibrating hanger coupled to said head, mechanism for vibrating the same, and means connected with said head and holding the same and the tines to reciprocate in parallel planes, approximately without a swinging movement, substantially as described.

4. In a potato-digger, in combination, a supporting device, digging means, a separator having a head and tines, swinging vibrating means to reciprocate said separator, mechanism connected with the head of said separator and holding the tines at the desired angle and against a swinging movement, thereby causing them to reciprocate in parallel or straight planes, substantially as described.

5. In a potato-digger, the combination of a center beam, a shovel having end hangers rigid therewith, a horizontal bolt pivotally coupling the upper ends of said hangers to said beam, a lever fulcrumed on the beam and provided with locking means, links from the lever connected pivotally with intermediate portions of said hangers, whereby the tilt of the shovel can be varied, a wheeled support, and lifting mechanism whereby the beam and shovel can be raised and lowered independently of the wheeled support, substantially as described.

6. In a potato-digger, the combination of a frame to which the draft is attached, a wheeled axle loosely coupled to the rear of the frame, lifting means carried by the axle and comprising a lever and lock and crank-arm for raising and lowering said frame, a shovel carried by the frame and pivotally joined thereto, and a lever carried by the frame and provided with locking means and connected with the plow to vary and determine the tilt thereof independently of said frame.

7. In a potato-digger, the combination of a supporting-frame, the shovel having upturned ends, hangers secured thereto and pivotally connected with said frame, means for tilting the shovel and locking the same at the desired angle, said shovel having an approximately straight flat rear end and centrally and deeply depressed at its front edge, the shovel curving transversely, longitudinally, downwardly and forwardly to said centrally-depressed front portion, whereby the shovel roots forwardly through the ground to avoid cutting the potatoes and gradually spreads out the mass of earth and potatoes as it passes rearwardly over the shovel, a vibrating separator beneath said rear edge of the shovel and extending rearwardly therefrom, separator-hangers pivotally joined to said shovel-hangers and supported thereby, and actuating mechanism, substantially as described.

8. In a potato-digger, the combination of a central beam having a front vertical coupling, a draft-tongue having a wheeled support for its rear end and a rearwardly-extending coupling loosely interlocking with said beam-eye, said beam having a rear wheeled axle loosely coupled thereto, and a plow and separator, substantially as described.

9. In a potato-digger, the combination of a draft-frame, a shovel hung from said frame, supporting-hangers extending up from said shovel, a wheeled axle, swinging connections from the axle pivotally coupled to said hangers, depressing and lifting mechanism connected with the frame for positively forcing the frame (independently of the axle) down and the shovel into operative digging position and for raising the frame and the shovel clear of the ground for transportation, and locking mechanism, holding the axle and frame against independent vertical play, substantially as described.

10. In a potato-digger, the combination of a rear wheeled axle, a draft-frame, a depressing and lifting connection between the axle and frame comprising a lever and locking mechanism, whereby the frame, independently of the axle, can be positively forced down or raised and whereby the frame and axle can be locked together against independent vertical movement, a shovel having hangers pivotally connected with said frame, whereby the shovel is raised and lowered with the frame, and mechanism for tilting the shovel, substantially as described.

11. The separator having tines, each having offsets forming rearwardly-facing shoulders, the end head formed of two angle-bars, the ends of the tines between said bars conforming to the angle thereof and bent laterally, and clamping-bolts passed through said bars, substantially as described.

12. A potato-digger having a frame receiving the draft, a rear axle loosely coupled to the frame and permitting vertical movement of the frame independently of the axle, a lifting-lever for said frame carried by the axle and provided with locking means the shovel having hangers pivotally joined to the frame, and a lever having locking means and mounted on the frame and pivotally connected with intermediate portions of the hangers to vary the tilt of the plow, substantially as described.

13. A potato-digger having a frame carrying the shovel, and a rear wheeled axle having swinging supports pivotally connecting to the frame and lifting and locking means carried by said supports to raise and lower the frame and the plow from said axle, substantially as described.

14. In combination, in a potato-digger, a frame, a transversely-arranged shovel, hangers rigid with and extending up from the ends of the shovel and at their upper ends pivotally joined to said frame, bracing and holding links pivotally joined with said hangers between the frame and shovel, and actuating and locking means carried by the frame and connected with said links, whereby the links can be moved to swing the hangers and shift the shovel to various angles, substantially as described.

15. A frame having a wheel-support, in combination with a transversely-arranged approximately flat shovel having a front cutting edge, hangers rigid with and extending up from the ends of the shovel and at their upper ends confined to the frame, and actuating and controlling means mounted on the frame independently of said hangers to tilt the shovel and hold the same in the desired adjustment and pivotally joined with said hangers, substantially as described.

16. In combination, a supporting-frame, a transversely-arranged shovel, hangers secured to the ends of the shovel and extending up therefrom and confined to the frame and provided with rearwardly-extending intermediate brackets, a separator arranged in rear of the shovel, vibrating supports therefor pivotally joined to said brackets and loosely joined to the separator and holding the same at the desired angle, and actuating means, substantially as described.

17. In combination, a supporting-frame, a transversely-arranged shovel, hangers from the frame carrying said shovel, a movable separator at the rear of the shovel, separator actuating and controlling supports loosely carried by said hangers and approximately preserving the angle of the separator with the shovel, and means for tilting the shovel and its hangers, substantially as described.

18. In combination, a center beam having a support, a shovel beneath the same, upright hangers carrying the shovel and at their upper ends pivoted to the beam, a lever pivoted to said beam and having locking means, brace and controlling links pivotally joined to said lever and to intermediate portions of said hangers between the beam and shovel, substantially as described.

19. In a potato-digger, the combination of a wheeled axle provided with driving-gearing, a vertically-movable frame, swinging connections between the axle and frame permitting vertical movement of the frame independently of said axle, elevating and depressing mechanism for said frame provided with locking means, whereby the frame can be forced up or down and locked against vertical movement independently of the said axle, a shovel, hangers carrying the same and pivotally connected with the frame and provided with controlling and locking means, a vibrating separator provided with supports, a rotary shaft carried by said frame and having operating connections to said separator, said shaft geared to said driving-gearing and maintained in gear therewith as the frame moves vertically, substantially as described.

20. In combination, a frame to which the draft is attached, a shovel carried by the frame, a rear wheeled axle, radial arms carried thereby and pivotally joined at their free ends to the frame, and lever-operated lifting means carried by the axle and loosely coupled to the frame and provided with locking means, substantially as described.

21. In combination, a supporting-frame, a plow having end hangers confined to the frame, a rear wheeled axle, radial arms loose thereon and pivotally joined to said hangers, and lifting means carried by the axle and loosely coupling to the frame and provided with locking means, substantially as described.

22. In combination, a frame, a plow carried thereby, a rear wheeled axle, a sleeve loose on the axle, supports rigid with the sleeve and at their free ends pivotally connected to carry the frame vertically, and lifting means, substantially as described.

23. In combination, a supporting-frame, a plow having hangers rigid therewith and depending from the frame, a rear wheeled axle, arms loose thereon and at their front ends pivotally joined to said hangers, a rock-shaft carried by the axle and having a lifting-crank loosely confined to the frame, and means to lock the same and said arms, substantially as described.

24. A potato-digger having a reciprocating separator and means for vibrating the same comprising parallel links applied to one end of the separator and holding the same to reciprocation in an approximately fixed plane, substantially as described.

25. In combination, in a potato-digger, supporting and actuating devices, a digging implement, a separator having cross-heads rigid therewith, an upright vibrating frame fulcrumed between its ends and at its lower ends pivotally joined to said cross-heads, and links beside said frame and pivoted at their upper ends and at their lower ends pivotally joined to said cross-heads independently of said frame, substantially as described.

26. A potato-digger having a supporting-frame provided with a plow, a rear wheeled axle, a gear thereon, radial arms therefrom and at their outer ends pivotally connected to move vertically with the frame, a driving-shaft mounted at the outer ends of one of said arms and having a pinion meshing with said gear, a separator having a vibrating frame provided with a pitman eccentrically connected to said shaft.

27. In a potato-digger, supporting devices, a transversely-arranged shovel, hangers secured to intermediate portions of the side ends of the shovel, a separator having its head arranged transversely beneath the rear end of the shovel and provided with rearwardly-extending tines so that the material passing over the shovel moves onto said tines in rear of the head thereof, separator supporting and vibrating means extending up from said head in rear of said hangers and pivotally connected therewith and carried thereby, a vertically-movable frame carrying said hangers, and actuating devices for said separator-vibrating means carried by and moving vertically with said frame, substantially as described.

28. The separator comprising an end head provided with vibrating means, and the tines extending from said head, said head comprising angle-bars, clamping-bolts passed therethrough, the tines having their ends clamped between said bars bent to conform to the angle thereof with their extremities deflected laterally between the bars, substantially as described.

29. The separator comprising the head formed of two clamping-bars, tines having bent ends between said bars, and clamping-bolts passed through the plates and in front of said bent ends, substantially as described.

30. The separator comprising the angle-bars, the tines between the same and bent to the angle thereof with rear deflected ends, and bolts passed through the bars at said deflected ends, substantially as described.

31. In a potato-digger, the combination of a frame, a shovel, a separator, hangers movably joined to the frame and supporting both the shovel and the separator, mechanism for raising and lowering the shovel and separator together, and mechanism for changing the tilt of the shovel and separator simultaneously, substantially as described.

32. In combination, a beam, a shovel carried thereby, a wheeled axle, and a lifting-shaft carried thereby and applied to the rear of the beam to raise and lower the same independently of the axle, substantially as described.

33. In combination, a vertically-movable frame, a transversely-arranged shovel coupled therewith, a wheeled axle having swinging radial arms, connections from the ends of the shovel pivotally joined directly to the free ends of said arms, and lifting and locking means for said frame, substantially as described.

34. A potato-digger having its shovel provided with hangers, and supports to which the hangers are pivotally joined in the same axis and at several points above the shovel, substantially as described.

35. The transversely-arranged approximately flat shovel having a centrally-depressed front edge and the upturned side ends with lateral flanges, in combination with the hangers overlapping and bolted to said ends and fitting between the flanges thereof, and supporting devices, substantially as described.

36. In a potato-digger, the combination of a vertically-movable frame, to which the draft is applied, digging means carried thereby, a rear wheeled supporting device, and supporting means therefrom to said frame provided with lifting and locking mechanism arranged to raise and lower the frame with the digging means and hold the same in the lowered and raised positions, substantially as described.

37. A potato-digger having a central beam to which the draft is applied, provided with wheeled supporting means and carrying lifting and locking mechanism for raising and lowering the beam, said mechanism loosely confined directly to the rear end of the beam and positively moving the same vertically and the shovel having hangers from said central beam, substantially as described.

38. The combination of supporting means, a beam, a shovel having hangers at their upper portions bolted on opposite sides of the beam, and a seat having a support secured to the beam by the same means securing said hangers thereto, substantially as described.

39. In combination, a beam, the plate above said beam with downturned lugs on opposite sides thereof and secured thereto, and the rider's seat carried by said plate, substantially as described.

40. In combination, supporting devices, a beam, a transversely-arranged shovel, hangers secured to the side ends of said shovel and extending upwardly and deflected inwardly at their upper ends to opposite sides of said beam, means securing the said hangers to said beam, and braces to the hangers, substantially as described.

41. In combination, supporting devices, a shovel having supporting-hangers, brackets secured to said hangers, braces secured to the front ends of the brackets, separator-supports secured to the rear ends of said brackets, and a separator carried thereby, substantially as described.

42. In combination, supporting devices, a transversely-arranged shovel, hangers from the ends thereof and secured to a support at their upper ends, brackets secured to said hangers and extending upwardly, and supporting-arms to which the upper ends of said brackets are secured, substantially as described.

43. In combination, supporting and carrying devices, a transversely-arranged shovel, hangers extending up from the side ends thereof and secured at their upper ends, arms rigid with and extending rearwardly from intermediate portions of said hangers, the tine-separator having its head beneath the shovel, an upright frame or bail in rear of said hangers and having vibrating means coupled to its upper end, said frame fulcrumed to said arms and at its lower ends coupled to said head, and links pivotally joined to said arms and to said head, substantially as described.

In testimony whereof I affix my signature in presence of two witnesses.

JOHN E. BAIRD.

Witnesses:
EDWARD CANTWELL,
J. H. DUDLEY.